United States Patent
Yamakage et al.

(10) Patent No.: US 7,907,633 B2
(45) Date of Patent: Mar. 15, 2011

(54) DATA MULTIPLEXING/DEMULTIPLEXING APPARATUS

(75) Inventors: Tomoo Yamakage, Yokohama (JP); Shinichiro Koto, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 12/390,249

(22) Filed: Feb. 20, 2009

(65) Prior Publication Data

US 2009/0154499 A1    Jun. 18, 2009

Related U.S. Application Data

(63) Continuation of application No. PCT/JP2008/052666, filed on Feb. 18, 2008.

(30) Foreign Application Priority Data

Feb. 19, 2007 (JP) ................. 2007-038673
Apr. 26, 2007 (JP) ................. 2007-117668

(51) Int. Cl.
*H04J 3/24* (2006.01)
*H04J 3/04* (2006.01)
*H04J 3/00* (2006.01)
*H04L 12/28* (2006.01)
*H04N 5/91* (2006.01)

(52) U.S. Cl. .... 370/474; 370/535; 370/476; 370/395.64; 386/98

(58) Field of Classification Search ............. 370/474, 370/535–536, 487, 412, 537, 252, 476, 395.64, 370/466; 386/98

See application file for complete search history.

(56) References Cited

U.S. PATENT DOCUMENTS

| | | | | |
|---|---|---|---|---|
| 6,529,550 | B2 * | 3/2003 | Tahara et al. | 375/240 |
| 7,058,965 | B1 * | 6/2006 | Gordon et al. | 725/39 |
| 7,499,469 | B2 * | 3/2009 | Fu et al. | 370/466 |
| 7,643,513 | B2 * | 1/2010 | Yang et al. | 370/503 |
| 7,660,328 | B1 * | 2/2010 | Oz et al. | 370/466 |
| 2001/0040889 | A1 * | 11/2001 | Matsuzaki et al. | 370/389 |
| 2001/0055318 | A1 * | 12/2001 | Obata et al. | 370/474 |
| 2002/0048282 | A1 * | 4/2002 | Kawamae et al. | 370/487 |
| 2004/0255063 | A1 | 12/2004 | Crinon et al. | |
| 2006/0133429 | A1 * | 6/2006 | Seo et al. | 370/535 |

(Continued)

FOREIGN PATENT DOCUMENTS

EP    1 599 043 A1    11/2005

(Continued)

OTHER PUBLICATIONS

International Standsard, ISO/IEC 13818-1:2000, Section 2.5.3.5, Table 2-34, 3 pages.

(Continued)

*Primary Examiner* — Kwang B Yao
*Assistant Examiner* — Candal Elpenord
(74) *Attorney, Agent, or Firm* — Oblon, Spivak, McClelland, Maier & Neustadt, L.L.P.

(57) ABSTRACT

In generation of a system header included in an program stream of extended MPEG-2 Systems, when a basic stream ID is an extension ID and basic buffer size information represents 0 byte, extension buffer size information expressed by a total of 24 bits of an extension ID, a marker bit and an extension stream ID and a total of 24 bits including an extension stream ID, a marker bit and extension buffer bound scale information and required for reproduction of an elementary stream to be multiplexed using a pair of an extension ID and an extension stream ID is generated and recorded.

6 Claims, 19 Drawing Sheets

U.S. PATENT DOCUMENTS

| | | |
|---|---|---|
| 2006/0193350 A1 | 8/2006 | Chen |
| 2006/0203852 A1* | 9/2006 | Yoshida ................ 370/503 |
| 2006/0215664 A1 | 9/2006 | Iwase et al. |
| 2007/0133610 A1* | 6/2007 | Shikatani ................ 370/487 |

FOREIGN PATENT DOCUMENTS

| | | |
|---|---|---|
| JP | 2005-531960 | 10/2005 |
| JP | 2006-509409 | 3/2006 |
| WO | WO 2006/098395 A1 | 9/2006 |
| WO | WO 2008/102732 | 8/2008 |

OTHER PUBLICATIONS

International Standsard, ISO/IEC 13818-1:2000/Amd 2:2004, Item 4, 5 pages.

"Text of ISO/IEC 13818-1:200X (3rd edition)", "Information Technology—Generic coding of moving pictures and associated audio information: Systems", Series H: Audiovisual and Multimedia Systems, Infrasturcture of audiovisual services—Transmission multiplexing and synchronization, ITU Study Group 16,—Video Coding Experts Group—ISO/IEC MPEG & ITU-T VCEG (ISO?IEC JTC1/SC29/WG11 and ITU-T SG16 Q6), H.222.0, XP30014396A, Mar. 29, 2006.

Search Report issued Nov. 30, 2010, in Malaysia Patent Application No. PI 20090820, filed Feb. 18, 2008 (in English).

Extended Europea Search Report issued Oct. 6, 2010, in Application No. 08711490.6-1247 / 2114075 PCT/JP2008052666.

* cited by examiner

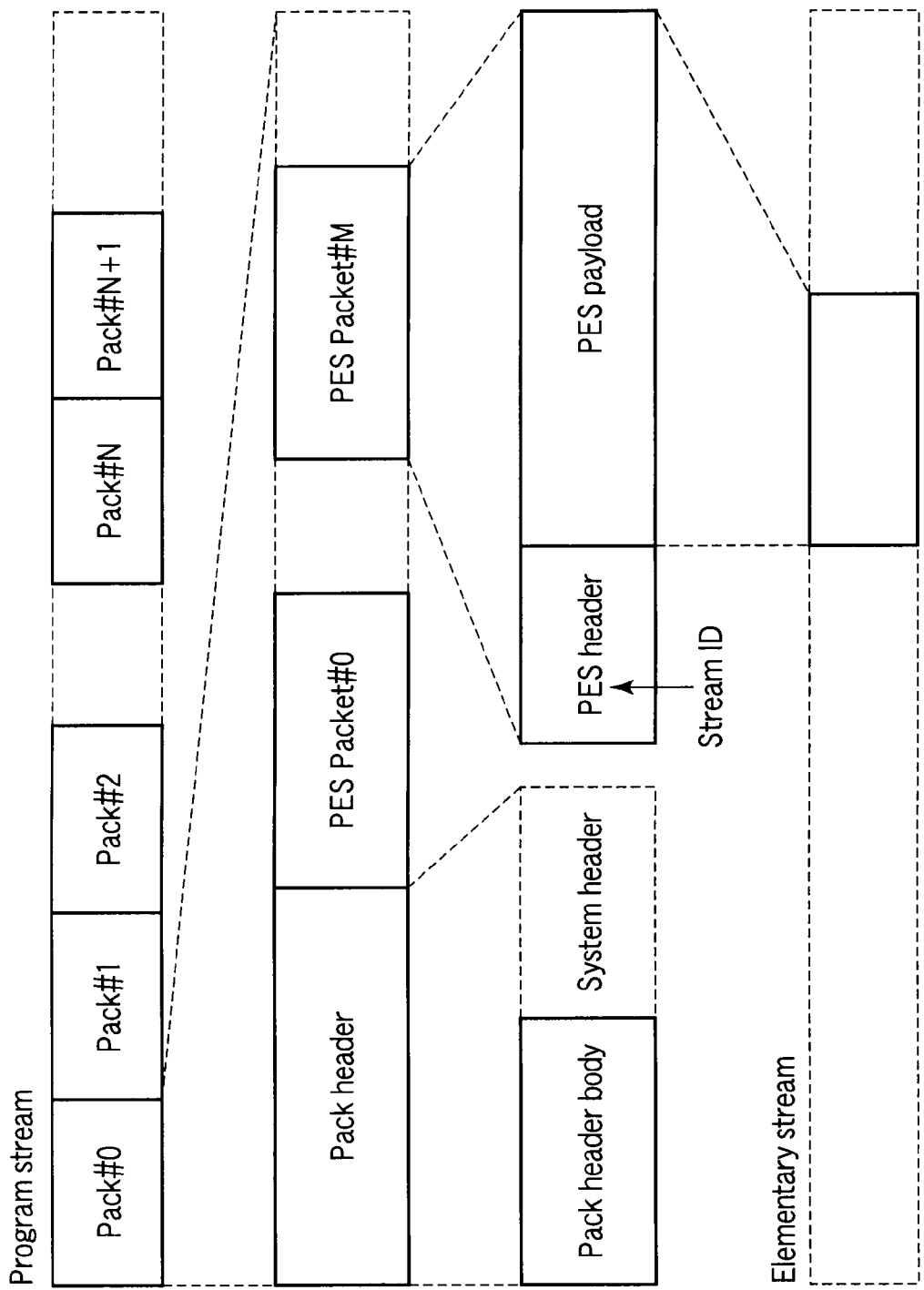
F I G. 1

```
system_header() {
    ....
    reserved_bits                              7bits
    while (nextbits () == '1') {
Stream ID → Stream_id                          8bits
        '11'                                   2bits
Buffer size information ⎰ P-STD_buffer_bound_scale    1bit
                        ⎱ P-STD_buffer_size_bound    13bits
    }
}
```

FIG. 2

```
system_header() {
    . . . .
    reserved_bits                                          7bits
    while (nextbits () == '1') {
        stream_id                                          8bits
        '11'                                               2bits
        P-STD_buffer_bound_scale                           1bit
        P-STD_buffer_size_bound                            13bits if (stream_id == 0xFD
        && P-STD_buffer_size_bound == 0) {
            'OxFD'                                         8bits
            '11'                                           2bits
            reserved                                       7bits
            stream_id_extension                            7bits 'OxFD'                                         8bits
            '11'                                           2bits
            P-STD_buffer_bound_scale_extension             1bit
            P-STD_buffer_size_bound_extension              13bits
        }
    }
}
```

FIG. 3

```
system_header() {
    ....
    reserved_bits                                                   7bits
    while (nextbits () == '1') {
1111_1101           stream_id                                       8bits
11                  '11'                                            2bits
0                   P-STD_buffer_bound_scale                        1bit
0_0000_0000_0000    P-STD_buffer_size_bound                         13bits
        if (stream_id == 0xFD
        && P-STD_buffer_size_bound == 0) {
1111_1101               '0xFD'                                      8bits
11                      '11'                                        2bits
11_1111_1               reserved                                    7bits
000_0011                stream_id_extension                         7bits 1111_1101               '0xFD'                                      8bits
11                      '11'                                        2bits
0                       P-STD_buffer_bound_scale_extension          1bit
0_0000_1001_1100        P-STD_buffer_size_bound_extension           13bits
        }
    }
}
```

F I G. 4

```
system_header() {
    ......
    reserved_bits                                               7bits
    while (nextbits () == '1') {
        stream_id                                               8bits
        '11'                                                    2bits
        P-STD_buffer_bound_scale                                1bit
        P-STD_buffer_size_bound                                 13bits
        if (stream_id == 0xFD
        && P-STD_buffer_size_scale == 0
        && P-STD_buffer_size_bound == 0) {
            '0xFD'                                              8bits
            '11'                                                2bits
            reserved                                            7bits
            stream_id_extension                                 7bits
            '0xFD'                                              8bits
            '11'                                                2bits
            P-STD_buffer_bound_scale_extension                  1bit
            P-STD_buffer_size_bound_extension                   13bits
        }
    }
}
```

FIG. 7

```
system_header() {
    ....
    reserved_bits                                              7bits
    while (nextbits () == '1') {
        stream_id                                              8bits
        '11'                                                   2bits
        P-STD_buffer_bound_scale                               1bit
        P-STD_buffer_size_bound                                13bits
        while (stream_id == 0xFD
        && P-STD_buffer_size_bound == 0
        && nextbits() == 0xFD) {
            'OxFD'                                             8bits
            '11'                                               2bits
            reserved                                           7bits
            stream_id_extension                                7bits 'OxFD'                                             8bits
            '11'                                               2bits
            P-STD_buffer_bound_scale_extension                 1bit
            P-STD_buffer_size_bound_extension                  13bits
        }
    }
}
```

FIG. 8

```
system_header() {
    ....
    reserved_bits                                               6bits
    extension_buffer_size_signaling_flag                        1bit
    while (nextbits () == '1') {
        stream_id                                               8bits
        '11'                                                    2bits
        P-STD_buffer_bound_scale                                1bit
        P-STD_buffer_size_bound                                 13bits
        if (extension_buffer_size_signaling_flag == 0
        && stream_id == 0xFD) {
            'OxFD'                                              8bits
            '11'                                                2bits
            reserved                                            7bits
            stream_id_extension                                 7bits
        }
    }
    ....
}
```

FIG. 9

```
system_header() {
    ....
    reserved_bits                                              6bits
    extension_buffer_size_signaling_flag                       1bit
    while (nextbits () == '1') {
            if (extention_buffer_size_signaling_flag == 0
            && nextbits() == 0xFD) {
                    'OxFD'                                     8bits
                    '11'                                       2bits
                    reserved                                   7bits
                    stream_id_extension                        7bits
            }
            stream_id                                          8bits
            '11'                                               2bits
            P-STD_buffer_bound_scale                           1bit
            P-STD_buffer_size_bound                            13bits
    }
}
```

F I G. 10

```
system_header() {
    . . . .
    reserved_bits                                          6bits
    extension_buffer_size_signaling_flag                    1bit
    while (nextbits () == '1') {
        stream_id                                          8bits
        if (extension_buffer_size_signaling_flag == 0
        && stream_id == 0xFD) {
            '11'                                           2bits
            reserved                                       7bits
            stream_id_extension                            7bits
            '0xFD'                                         8bits
        }
        '11'                                               2bits
        P-STD_buffer_bound_scale                            1bit
        P-STD_buffer_size_bound                           13bits
    }
}
```

FIG. 11

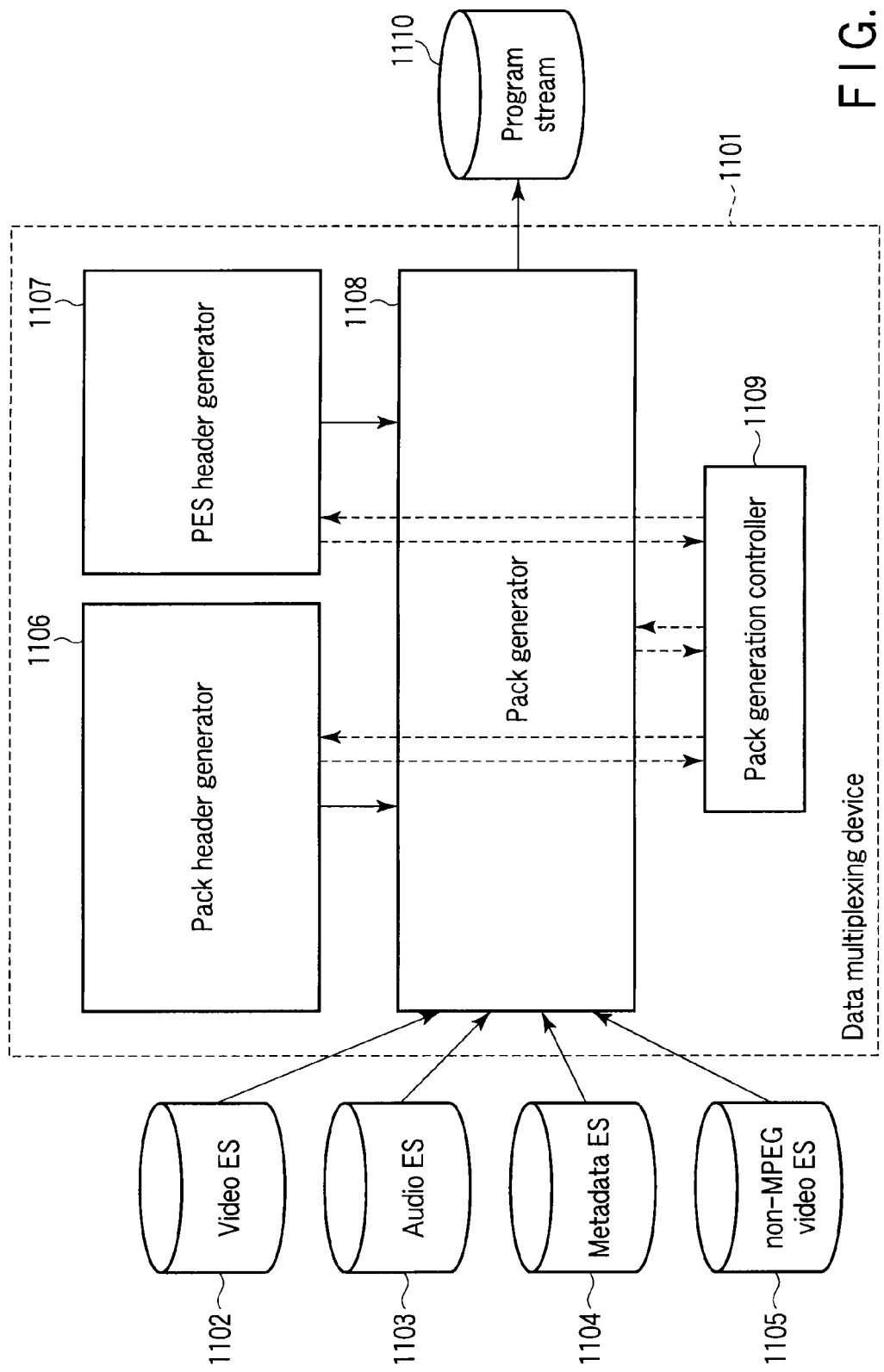
F I G. 12

```
system_header() {
    . . . .
    reserved_bits                                          7bits
    while ( nextbits () == '1' ) {
            stream_id                                      8bits
            if ( stream_id == '0xB7' ) {
                    '11'                                   2bits
                    '00 0000 0'                            7bits
                    stream_id_extension                    7bits
                    '0xB6'                                 8bits
                    '11'                                   2bits
                    P-STD_buffer_bound_scale_extension     1bit
                    P-STD_buffer_size_bound_extension      13bits
            }
            else {
                    '11'                                   2bits
                    P-STD_buffer_bound_scale               1bit
                    P-STD_buffer_size_bound                13bits
            }
    }
}
```

FIG. 18

DATA MULTIPLEXING/DEMULTIPLEXING APPARATUS

CROSS-REFERENCE TO RELATED APPLICATIONS

This is a Continuation Application of PCT Application No. PCT/JP2008/052666, filed Feb. 18, 2008, which was published under PCT Article 21(2) in Japanese.

This application is based upon and claims the benefit of priority from prior Japanese Patent Applications No. 2007-038673, filed Feb. 19, 2007; and No. 2007-117668, filed Apr. 26, 2007, the entire contents of both of which are incorporated herein by reference.

BACKGROUND OF THE INVENTION

1. Field of the Invention

This invention relates to a data multiplexing method for allowing video data, audio data and metadata to be reproduced synchronously and an apparatus for the same, and a data demultiplexing method and apparatus.

2. Description of the Related Art

As for a method for multiplexing elementary data series of video data, audio data and metadata to reproduce them synchronously, MPEG-2 Systems (ISO/IEC13818-1) are laid down as an international standard (ITU-T Rec.H.222.0 (2000)|ISO/IEC 13818-1:2000 (MPEG-2 Systems)). The original MPEG-2 Systems standard establishes a mechanism of multiplexing video code data, which is encoded by an MPEG standard family video encoding scheme such as MPEG-1, MPEG-2 or MPEG-4, audio code data and the data which a user defined privately. Thereafter, the MPEG-2 Systems standard established expansion of a standard to support multiplexing of the metadata (ITU-TRec.H.222.0 (2000)/Amd.2 (06/2003)|ISO/IEC13818-1:2000/Amd.2:2004).

The MPEG-2 Systems standard defines two types of multiplexing formats of a transport stream (TS) and a program stream (PS). TS is a format utilized by broadcast, and a program stream is utilized in DVD. The program stream is formed in unit called a plurality of packs. The pack is formed of one pack header and 0 or more PES (Packeted Elementary Stream) packets. The pack header is formed of one main pack header and 0 or 1 system header, and includes information of a time at which the pack is received. The PES packet is formed of one PES header and a PES payload of 0 or more bytes. The elementary stream such as video data, audio data and metadata is divided in a suitable size and stored in the PES payload. The stream ID that is an identifier for classifying data included in the PES payload is recorded in the PES header, and one continuous elementary stream can be derived from the divided elementary streams by coupling PES payloads of the same stream ID. Further, when the data included in the PES payload includes a boundary of a picture of video or a frame of audio, the time at which a next picture or a next frame is reproduced and displayed may be recorded in the PES header in a form of a relative time from a receipt time of the pack indicated by receipt time information in the pack header.

A system header includes information on a systematic feature of the program stream. For example, buffer size information necessary for generating and reproducing an elementary stream of a stream ID is recorded in a form of a pair of the stream ID and buffer size.

In extension of a MPEG-2 Systems standard for meta data multiplexing, which is disclosed in ITU-TRec.H222.0 (2000)/Amd2 (06/2003)|ISO/IEC13818-1:2000/Amd2:2004, a value such as extension ID (extended_stream_id=0xFD) is newly defined to the stream ID for use in the PES header so that plural meta data can be identified. In the case of extension ID, 128 kinds of elementary streams can be identified using a value of 7 bits as referred to as an extension stream ID (stream_id_extension).

However, in extension of MPEG-2 Systems by a technique disclosed in ITU-TRec.H.222.0 (2000)/Amd.2 (06/2003)|ISO/IEC13818-1:2000/Amd2:2004, a recording scheme for buffer size information (extension buffer size information) for every extension stream ID is not extended nor provided in system header. Therefore, only recording the buffer size information commonly on the extension ID is possible as it is, and an additional extension of the standard is desired in order to provide a scheme for recording the extension buffer size information for every extension stream ID.

Products using the extension disclosed in ITU-TRec.H.222.0 (2000)/Amd.2 (06/2003)|ISO/IEC13818-1:2000/Amd.2.2004 have already been released in the market. Accordingly, when additional extension of the standard is done, it is desired in industry to have "back word compatibility" for the purpose of avoiding confusion in the market. Further, it is desirable to ensure "forward compatibility" that allows data (a program stream) created according to an existing standard to be normally reproduced even by equipment developed according to the additional extension standard.

It is an object of the present invention to provide a data multiplexing/demultiplexing method and an apparatus for the same which can record extension buffer size information for each extension stream ID without generating an error at the time of playback by use of conventional equipment and at the time of playback of conventional data by use of new equipment.

BRIEF SUMMARY OF THE INVENTION

According to one aspect of the invention, there is provided a data multiplexing apparatus comprising: an input unit to input an elementary stream representing at least one data of video data, audio data and metadata, a PES payload generator to generate a plurality of PES payloads by dividing the elementary stream; a PES packet generator to generate the plurality of PES packets corresponding to the plurality of PES payloads, respectively, by adding, to each of the plurality of PES payloads, a PES header including either (A) a basic stream ID that is a value of a given range which enables to be expressed by 8 bits or (B) a set of an extension ID that is a value that enables to be expressed by 8 bits outside the given range and an extension stream ID that is a value that enables to be expressed by 7 bits, to identify data contained in the PES payloads; a basic buffer size information generator to generate buffer size information for a basic stream ID of 24 bits comprising of a first field of 8 bits indicating the basic stream ID, a second field of 2 bits following the first field, a third field of 1 bit following the second field and indicating buffer bound scale information necessary for reproduction of the elementary stream identified by the basic stream ID, and a fourth fields of 13 bits following the third field and indicating buffer size bound information necessary for reproduction of the elementary stream; an extension buffer size information generator to generate buffer size information for an extension stream ID of 48 bits including (C) information of 24 bits comprising of a first field of 8 bits indicating a first identification ID that is a value capable of expressing by 8 bits outside the given range and different from the extension ID, a second field of 9 bits following the first field and a third field of 7 bits following the second field and indicating the extension stream ID and (D) information of 24 bits comprising of a first field of 8 bits indicating a second identification ID that is a value different from the first identification ID and the extension ID and capable of expressing by 8 bits outside the given range, a second field of 2 bits following the first field, a third field of 1 bit following the second field and indicating buffer bound scale information necessary for reproduction of the elementary stream identified by a set of the extension ID and the extension stream ID, and a fourth field of 13 bits following the third field and indicating buffer size bound information necessary for reproduction of the elementary stream; a pack generator to generate a pack by adding a pack header including a system header including the basic buffer size information for reproducing an elementary stream corresponding to each of the PES packets and the extension buffer size information to a PES packet array of the plurality of PES packets; and an output unit to output the pack as a program stream.

BRIEF DESCRIPTION OF THE SEVERAL VIEWS OF THE DRAWING

FIG. 1 is a diagram of a structure of a program stream in a MPEG-2 Systems standard.

FIG. 2 is a diagram showing a record format of buffer size information inside a system header according to an existing MPEG-2 Systems standard.

FIG. 3 is a diagram showing a record format of the buffer size information inside the system header according to a first embodiment.

FIG. 4 is a diagram of explaining an operation when the data generated according to the first embodiment is reproduced with the equipment developed according to the first embodiment.

FIG. 7 is a diagram showing modification of a record format of buffer size information inside the system header according to the first embodiment.

FIG. 8 is a diagram showing another modification of a record format of buffer size information inside the system header according to the first embodiment.

FIG. 9 is a diagram showing a record format of buffer size information inside a system header according to a second embodiment.

FIG. 10 is a diagram showing a modification of a record format of buffer size information inside the system header according to the second embodiment.

FIG. 11 is a diagram showing another modification of a record format of buffer size information inside the system header according to the second embodiment.

FIG. 12 is a block diagram of a data multiplexer according to the first and second embodiments.

FIG. 18 is a diagram showing a record format of buffer size information inside a system header according to a third embodiment.

DETAILED DESCRIPTION OF THE INVENTION

Basic Configuration of a Program Stream

Figure 5:
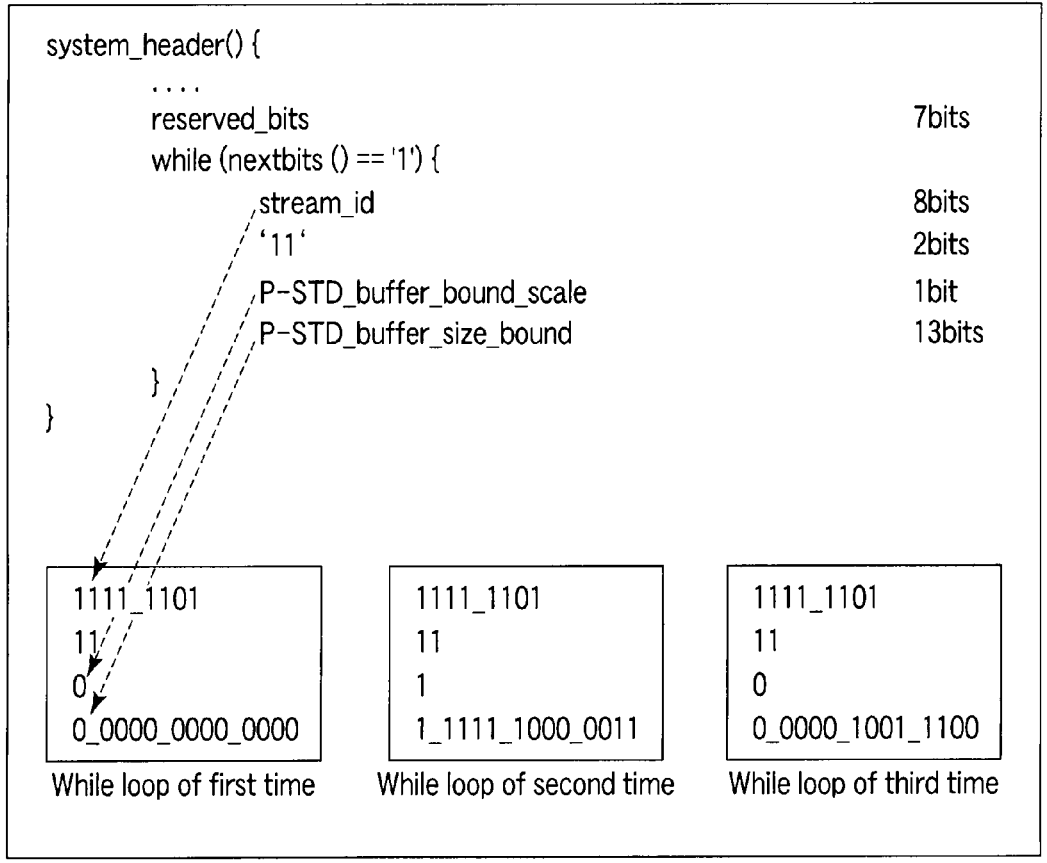
FIG. 5 is a diagram of explaining an operation when the data generated according to the first embodiment is reproduced with the equipment developed according to the conventional MPEG-2 Systems standard.

At first a program stream (PS) is explained using FIG. 1. As shown in FIG. 1, a program stream is configured in a unit as referred to as a plurality of packs. The pack includes one pack header and 0 or more PES packets.

The pack header includes one pack header body and 0 or one system header. The pack includes information (receipt time information) indicating a time at which the pack is received.

The PES packet includes a PES header and a PES payload of 0 or more bytes. The PES payload records part data cut out at a suitable size from an element (elementary stream) such as video data, audio (including speech) data and metadata.

A stream ID that is an identifier for identifying (classifying) data contained in the PES payload is recorded in the PES header at first. A continuous elementary stream is available from divided elementary streams by concatenating PES payloads of the same stream ID.

The number-of-bytes information of data contained in the PES payload is recoded in the PES header at second. A partial data that is cut out from the elementary stream by the size indicated by the number-of-bytes information is recorded in the PES payload.

If the data contained in the PES payload includes a boundary in a picture of a video or a frame of an audio, reproduction display time information indicating reproduction and display times of a next picture or a next frame is recorded in the PES header as relative time information from the receipt time information in the pack header.

The system header includes information on the systemic feature of the program stream. For example, buffer size information (referred to as basic buffer size information for the purpose of discriminating from extension buffer size information to be described below) indicating a buffer size necessary for generation and reproduction of the elementary stream of a certain stream ID is recorded in the system header with being paired with the stream ID. The basic buffer size information is expressed by a total of 24 bits of a stream ID of 8 bits (stream-ID), a marker bit '11' of 2 bits, buffer bound scale information of 1 bit (P-STD_buffer_bound_scale) and buffer size bound information of 13 bits (P-STD_buffer_size_bound) as shown in FIG. 2, for example. The system header also records extension buffer size information as described below.

There will now be described a data multiplexing method for multiplexing elementary streams according to the present embodiment to generate a program stream.

First Embodiment

A method for recording extension buffer size information according to the first embodiment will be described in conjunction with FIG. 3 hereinafter. The entire configuration of the program stream is shown in FIG. 1.

According to ITU-TRec.H.222.0 (2000) Amd, 2(06/2003) |ISO/IEC13818-1:2000/Amd.2:2004, the entire contents of which are incorporated herein by reference, the extension ID is defined as 0xFD. According to ITU-TRec.H.222.0 (2000) |ISO/IEC13818-1:2000 (MPEG-2 Systems), the entire contents of which are incorporated herein by reference, the basic buffer size information is defined as expressed by a combination of buffer bound scale information P-STD_buffer_bound_scale of 1 bit and buffer size bound information P-STD_buffer_size_bound of 13 bits as shown in solid lines in FIG. 3, and the basic buffer size information is calculated as follows.

(a) When P-STD_buffer_bound_scale is 0, 128*P-STD_buffer_size_bound bytes.

(b) When P-STD_buffer_bound_scale is 1, 1024*P-STD_buffer_size_bound bytes.

In general, it is impossible that the buffer size is 0 byte. By using this, as shown in italicized characters in FIG. 3 in the first embodiment, when the basic stream ID is the extension ID (0xFD) and the basic buffer size information (P-STD_buffer_size_bound) is 0, namely the buffer size is 0 byte, the extension buffer size information is recorded as shown in two dashed frames.

According to FIG. 3, the extension buffer size information is expressed by a total of 24 bits (first extended information) of the extension stream ID of 8 bits (stream_id_extension), marker bits '11' of 2 bits, reserved information of 7 bits (reserved) and the extension stream ID of 7 bits (stream_id_extension) and a total of 24 bits (second extended information) of marker bits '11' of 2 bits, buffer bound scale information of 1 bit (P-STD_buffer_bound_scale_extension) and buffer size bound information of 3 bits (P-STD_buffer_size_bound_extension). In this case, it becomes a key for assuring compatibility that a part within the dashed frame is similar in structure to a part within the solid line frame.

(Playback Operation with New Equipment)

There will be described an operation when the program stream generated according to the first embodiment is reproduced with the new equipment developed according to the first embodiment, referring to FIG. 4. It is supposed that a data series of FD, C0, 00, FD, FF, 83, FD, C0, 9C (hexadecimal form) is input as a program stream. A data series of FD, C0, 00, FD, FF, 83, FD, C0, 9C is expressed in a binary form on the left side of FIG. 4.

FD of the first 3 bytes of the program stream is interpreted as stream_id. The first two bits of C0 are interpreted as '11'. The third bit of C0 is interpreted as P-STD_buffer_bound_scale (value is 0). The bit on and after the fourth bit of C0 and 00 following this bit are interpreted as P-STD_buffer_bound (its value is 0).

In this way, since P-STD_buffer_bound is 0 and stream_id is 0xFD, it is determined that 6 bytes (FD, FF, 83, FD, C0, 9C) on and after the program stream are used for the extension buffer size information (a condition of if-statement of FIG. 4 comes to be true). There will be explained the above case hereinafter.

FD of next 3 bytes of the program stream is interpreted as 'FD'. The first two bits of the following FF byte are interpreted as '11'. The bit on and after the third bit of the FF byte and the first bit of the 83 byte following this bit are interpreted as "reserved" (its value is 0x7F). The MPEG-2 Systems standard defines "reserved" as that all bits are 1. The bit on and after the second bit of the 83 byte are interpreted as stream_id_extension (its value is 0x03). As a result, the buffer size information expressed by the following 3 bytes can be identified as extension buffer size information for the extension stream ID: 0x03.

FD of the following 3 bytes of the program stream is interpreted as 'FD'. The first 2 bits of C0 are interpreted as '11'. The third bit of C0 is interpreted as P-STD_buffer_bound_scale_extension (its value is 0). The bit on and after the fourth bit of C0 and 9C are interpreted as P-STD_buffer_bound_extension (its value is 0x9C). Accordingly, in an example shown in FIG. 4, the buffer size for the extension stream ID:0x03 is 128*156=19,968 bytes because 0x9C is 156 in a decimal form.

(Backward Compatibility)

A flow along which the program stream formed according to the first embodiment is interpreted with existing equipment is shown in FIG. 5. The data series which is a program stream used here is FD, C0, 00, FD, FF, 83, FD, C0, 9C (hexadecimal form) similarly to FIG. 4.

FD of first 3 bytes of the program stream is interpreted as stream-id. Top two bits of C0 are interpreted as '11'. The third bit of C0 is interpreted as P-STD_buffer_bound_scale (its value is 0). The bit on and after the fourth bit of C0 and 00 are interpreted as P-STD_buffer_bound (its value is 0).

A while-statement is continued because the first bit of FD of next 3 bytes of the program stream is 1. FD of next 3 bytes is interpreted as stream_id. The first two bits of FF are interpreted as '11'. The third bit of FF is interpreted as P-STD_buffer_bound_scale (its value is 1). The bit on and after the fourth bit of the FF byte and the 83 byte are interpreted as P-STD_buffer_bound (its value is 0x1F83).

A while-statement is continued because the first bit of FD of next 3 bytes of the program stream is 1. The following FD is interpreted as stream_id. The first 2 bits of C0 are interpreted as '11'. The third bit of C0 is interpreted as P-STD_buffer_bound_scale (its value is 0). The bit on and after the fourth bit of C0 and 9C are interpreted as P-STD_buffer_bound (its value is 0x009C).

In this way, because the program stream generated according to the first embodiment can be interpreted with existing equipment, it is clear that it has backward compatibility.

(Forward Compatibility)

Figure 6:
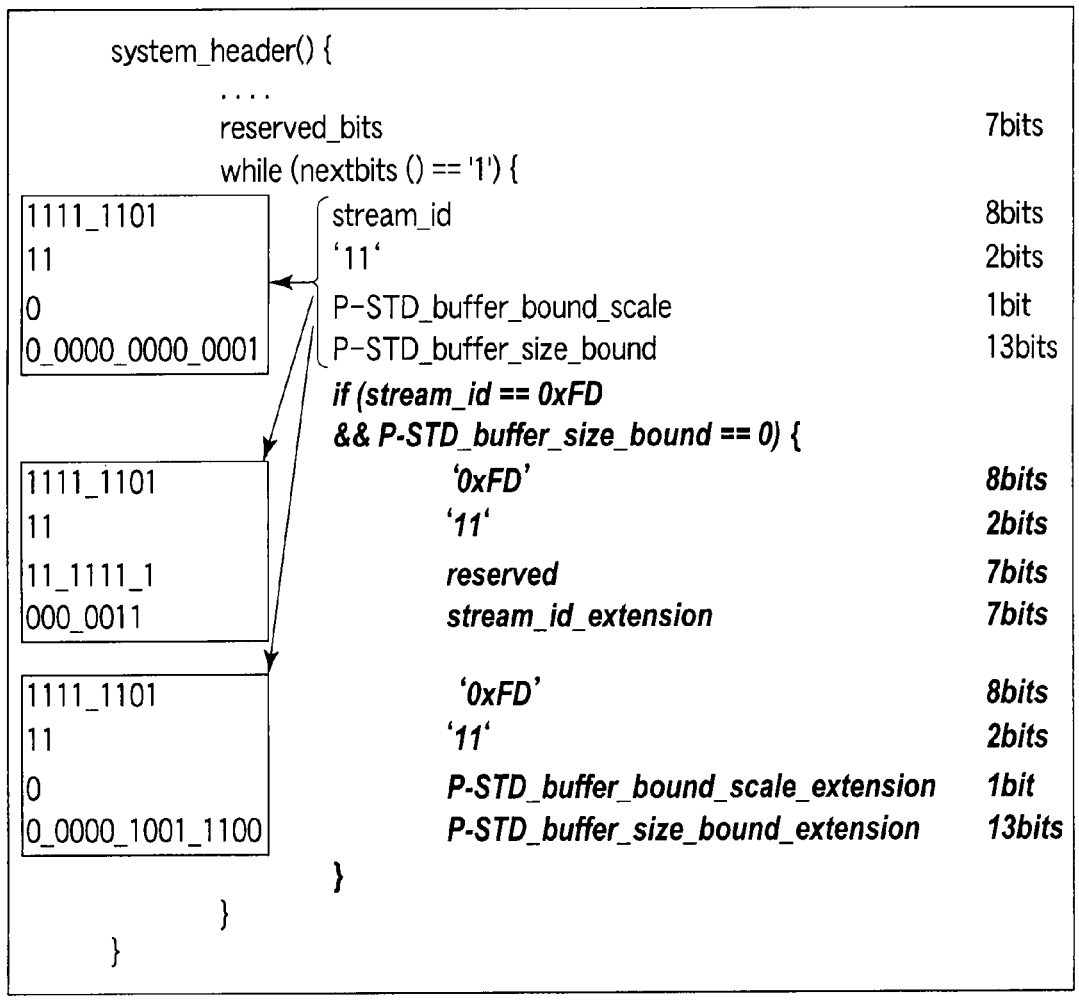
FIG. 6 is a diagram of explaining an operation when the data generated according to the conventional extended MPEG-2 Systems standard is reproduced with the equipment developed according to the first embodiment.

A flow along which the program stream generated according to a conventional MPEG-2 Systems standard is interpreted with the equipment developed according to the first embodiment is shown in FIG. 6. The data series which is a program stream used here is FD, C0, 00, FD, FF, 83, FD, C0, 9C (hexadecimal form) similarly to FIG. 4. FIG. 6 differs from FIGS. 4 and 5 in terms of a point that the third byte is 01. This is due to the reason it is not conceivable that the buffer size information represents 0 byte when the buffer size information is recorded according to the conventional MPEG-2 Systems standard.

At first, FD of first 3 bytes is interpreted as stream_id. The first two bits of C0 are interpreted as '11'. The third bit of C0 is interpreted as P-STD_buffer_bound_scale (its value is 0). The bit on and after the fourth bit of C0 and 01 are interpreted as P-STD_buffer_bound (its value is 1). In this case, P-STD_buffer_bound is not 0, and hence an if-statement is false and the condition of a while-statement is determined.

The while-statement is continued because the first bit of the first data (FD) of next 3 bytes is 1. The following FD is interpreted as stream_id. The first two bits of FF are interpreted as '11'. The third bit of FF is interpreted as P-STD_buffer_bound_scale (its value is 1). The bit on and after the fourth bit of FF and the 83 byte are interpreted as P-STD_buffer_bound (its value is 0x1F83). In this case, because P-STD_buffer_bound is not 0, the if-statement is false, and condition of the while-statement is determined.

The while-statement is continued because the first bit of next data (FD) is 1. The following FD is interpreted as stream_id. The first two bits of C0 are interpreted as '11'. The third bit of C0 is interpreted as P-STD_buffer_bound_scale (its value is 0). The bit on and after the fourth bit of C0 and 9C is interpreted as P-STD_buffer_bound (its value is 0x009C).

In this way, because the program stream generated according to the conventional MPEG-2 Systems standard is can be interpreted with the equipment developed according to the first embodiment, it is clear that the program stream generated according to the first embodiment has forward compatibility.

(Modification 1)

Modification of the first embodiment will be described referring to FIG. 7. In FIG. 7, whether P-STD_buffer_bound_scale is 0 is added to a conditional expression of an if-statement to determine whether the buffer size information for the extension stream ID is to be recorded.

In FIG. 4, when P-STD_buffer_bound is 0, P-STD_buffer_bound does not correspond to a record of extension buffer size information indicating that the buffer size of the extension ID is 0, because the buffer size information for extension stream ID is recorded unconditionally.

In contrast, in FIG. 7, the extension buffer size information indicating that the buffer size of the extension ID is 0 can be recorded by setting the buffer size information to P-STD_buffer_bound_scale=1
P-STD_buffer_bound=0

(Modification 2)

Another modification of the first embodiment will be described referring to FIG. 8. In FIG. 8, whether the following 8 bits are 0xFD is added to a condition expression of a while-statement for determining whether the recording extension buffer size information is to be recorded. As a result, recording of the extension stream ID and extension buffer size information can be repeated multiple times. In FIG. 3, since the upper while-loop is processed for each extension stream ID, a set of stream-id, '11', P-STD_buffer_bound_scale and P-STD_buffer_size_bound are recorded by the number of extension stream IDs. In contrast, with the modification of FIG. 8, the record of the set has only to be done once.

For a further variation, P-STD_buffer_size_scale==0 added in the modification of FIG. 7 may be added to the condition expression of the while-statement of the inner loop of FIG. 8.

Second Embodiment

A method for recording extension buffer size information (buffer size information for the extension stream ID) is described in conjunction with FIG. 9 hereinafter. The entire configuration of the program stream is shown in FIG. 1.

A difference between the second embodiment and the first embodiment is a point of defining flag information (extension_buffer_size_signaling_flag) of 1 bit for indicating the record of the extension buffer size information, and a point of determining existence of the field of the extension ID when the basic stream ID (stream_id) is in the while-statement and extension_buffer_size_signaling_flag is 0. In this case, it is assumed that the buffer size calculated by P-STD_buffer_bound_scale and P-STD_buffer_bound which appeared in front of the field of the extension stream ID is a buffer size for the extension stream ID.

In the data generated according to the existing MPEG-2 Systems standard, the bit corresponding to the extension_buffer_size_signaling_flag is reserved, and becomes 1. Therefore, an extension stream ID field does not appear in the equipment developed newly, but an error does not occur at the time of playback.

(Modification 1)

FIG. 10 shows a modification of the second embodiment. A difference from FIG. 9 is a point of transmitting second extension information including stream_id_extension as shown in a dashed frame, and then sending first extension information including P-STD_buffer_bound_scale and P-STD_buffer_bound as shown in a solid frame.

(Modification 2)

FIG. 11 shows another modification of the second embodiment. Similarly to FIG. 10, a difference from FIG. 9 is a point of transmitting second extension information including stream_id_extension as shown in a dashed frame, and then sending first extension information including P-STD_buffer_bound_scale and P-STD_buffer_bound as shown in a solid frame.

In the case of sending stream_id_extension before sending P-STD_buffer_bound_scale and P-STD_buffer_bound, the order of FD, '11', reserved and stream-id-extension in the dashed frame may differ as shown in FIGS. 10 and 11.

(Data Output Multiplexer)

There will now be described a data multiplexer to realize the data multiplexing method according to the first or second embodiment referring to FIG. 12.

The video elementary stream (ES) 1102 according to the MPEG standard, audio ES 1103 according to the MPEG standard, meta data ES 1104 and non-MPEG video ES 1105 aside from MPEG such as SMPTE VC-1 are input in a data multiplexer 1101. The data multiplexer 1101 multiplexes the video ES 1102, audio system ES 1103, metadata ES 1104 and non-MPEG video ES 1105 in a program stream form based on a suitable multiplexing algorithm to output a program stream 1110.

A pack generation controller 1109 controls the whole of the data output multiplexer 1101, and at first starts a pack header generator 1106 to generate a pack header, and then starts a PES header generator 1107 to generate a PES header. The pack generation controller 1109 starts a pack generator 1108 to output a pack header and a PES header as a program stream 1110, and then cuts out an appropriate number of bytes from a video ES 1102, audio system ES 1103, meta data ES 1104 or non-MPEG video ES 1105, and outputs it as the program stream 1110. The pack generation controller 1109 multiplexes respective elements such that the program stream has a structure shown in FIG. 1 by repeating this operation.

(Pack Header Generator)

Figure 13:
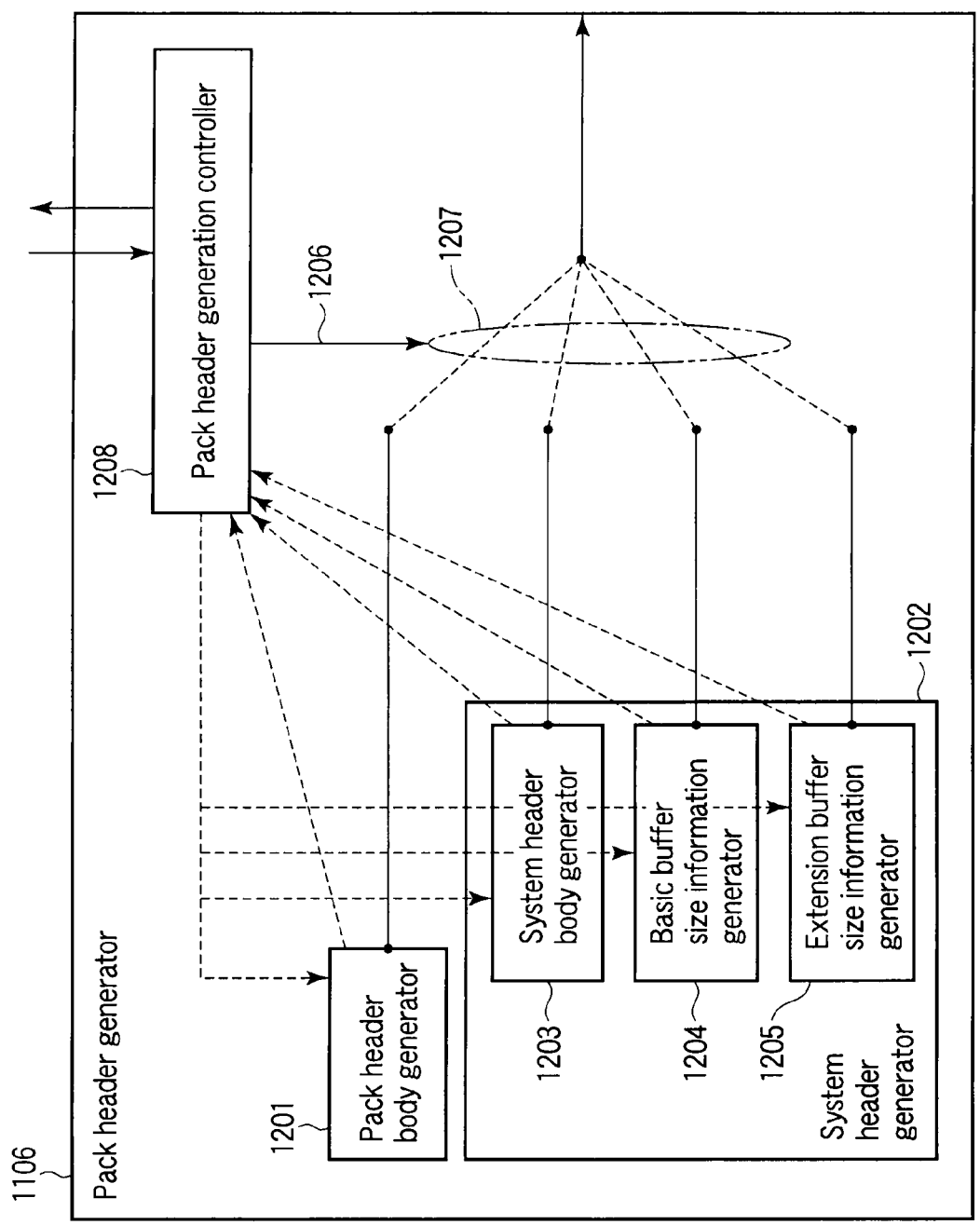
FIG. 13 is a block diagram of a pack header generator in FIG. 12.

As shown in FIG. 13, the pack header generator 1106 comprises a pack header body generator 1201, a system header generator 1202, a pack header generation controller 1208 and a pack header generation switch 1207. The system header generator 1202 includes a system header body generator 1203, a basic buffer size information generator 1204 and an extension buffer size information generator 1205, further. The pack header generation controller 1208 starts an operation by receiving a start signal from the pack generation controller 1109, and outputs a termination signal and a classification of the elementary stream which the pack generator should process subsequently to the pack generation controller 1109 when generation of the pack header completes.

The system header body generator 1203 generates information from immediately after of system_header( ) in FIG. 3 to reserved_bits. The basic buffer size information generator 1204 generates information surrounded by a solid line frame in FIG. 3. The extension buffer size information generator 1205 generates information surrounded by a dashed line frame in FIG. 3.

When a system header is contained in the pack, at first the pack header generation controller 1208 controls the pack header generation switch 1207 so that the pack header generation switch 1207 selects the output of the pack header body generator 1201 by a selection signal 1206. Next, the pack header generation controller 1208 controls the pack header generation switch 1207 so that the pack header generation switch 1207 selects the output of the system header body generator 1203 by a selection signal 1206.

Subsequently, the pack header generation controller 1208 controls the pack header generation switch 1207 so that the pack header generation switch 1207 selects the output of the basic buffer size information generator 1204 by the selection signal 1206. When the value of the basic ID is 0xFD, the pack header generation controller 1208 controls the basic buffer size information generator 1204 so that basic buffer size information (P-STD_buffer_size_bound) becomes 0, and then controls the pack header generation switch 1207 so that the pack header generation switch 1207 selects the output of the extension buffer size information generator 1205 by the selection signal 1206.

Thereafter, the necessary number of basic IDs and basic buffer size information corresponding to the extension IDs and extension buffer size information are generated. When all information to be multiplexed are generated in the pack, the pack header generation controller 1208 stops an operation of each generator and waits for start of the next pack.

In addition, in the case where the system header generator 1202 operates according to the example shown in FIG. 7, when the value of basic ID is 0xFD, the pack header generation controller 1208 controls the basic buffer size information generator 1204 for the purpose of setting the basic buffer size information (P-STD_buffer_size_scale and P-STD_buffer_size_bound) to 0.

Further, when the system header generator 1202 operates according to an example shown in FIG. 8, the pack header generation controller 1208 controls the pack header generation switch 1207 so that buffer sizes for a plurality of extension IDs are continuously generated as shown in FIG. 8.

(Data Multiplexing Procedure)

Figure 14:
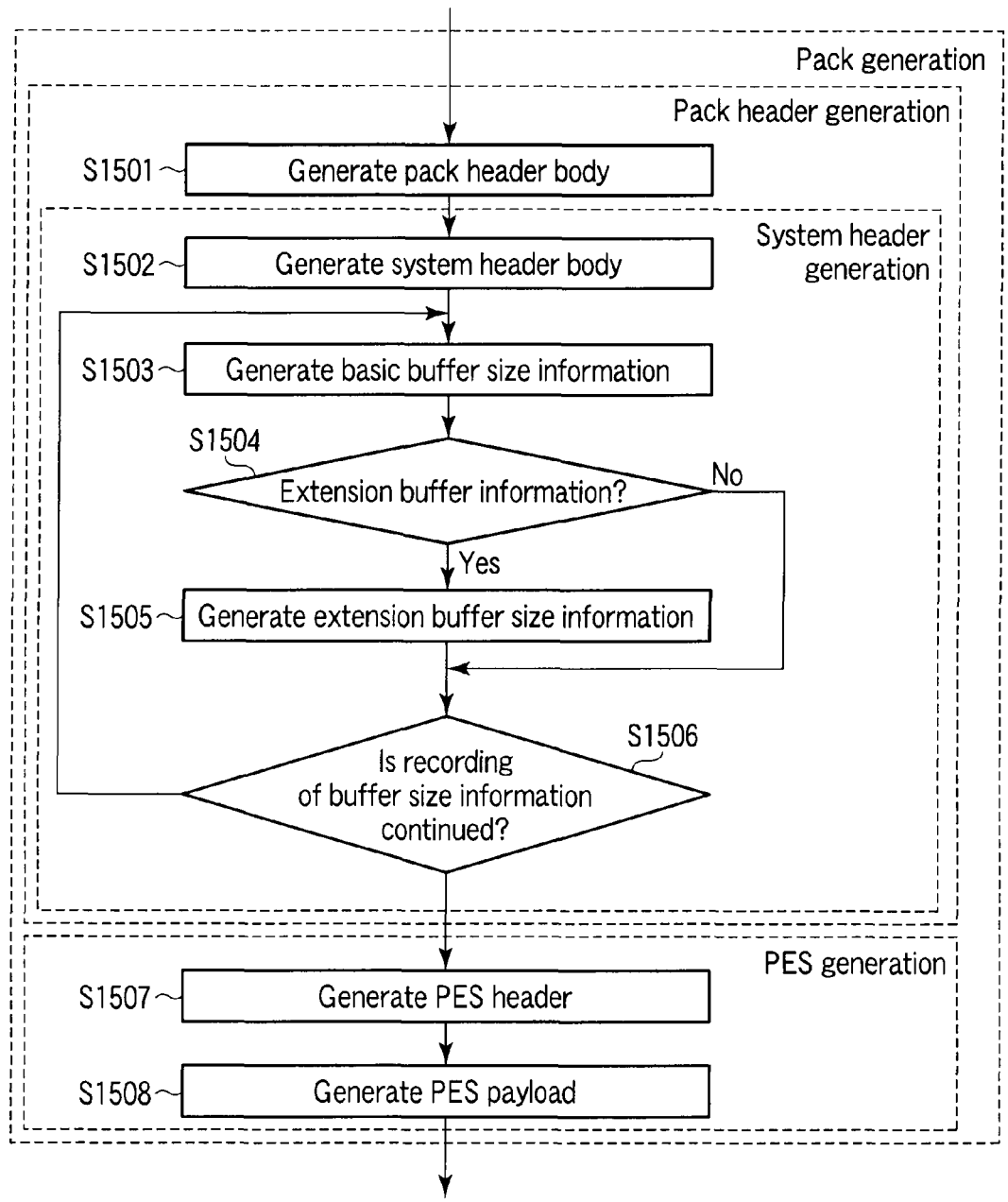
FIG. 14 is a flowchart for explaining a typical operation of the data multiplexer.

An operation procedure of the data output multiplexer of FIG. 13 will be described referring to FIG. 14. The flowchart of FIG. 14 shows a procedure for generating a program stream of a data format shown in FIG. 3 as an example of generating a pack by recording in a system header each pack size information of a buffer size (1808 kB) for a basic ID (0xE0), a buffer size (1808 kB) for extension ID (0xFD) that the extension stream ID is 0x55 and a buffer size (8192B) for a basic ID (0xC0).

When generation of the pack is started, at first the pack header body is generated in step S1501. When a system header is recorded in the pack, a system header body is generated in step S1502. Subsequently, the basic buffer size information indicating a (0xE0) buffer size (1808 kB) for the basic ID is recorded in step S1503 as follows.

stream_id=0xE0
P-STD_buffer_bound_scale=1
P-STD_buffer_size_bound=1808 (1808*1 kB=1808 kB)

Because buffer size information to be recorded first is one for the basic ID, it is determined not to record the extension buffer size in step S1504, and it is determined in step S1506 whether a record of the buffer size information is continued. As a result, because the record of the buffer size information comes to be continued, the process returns to step S1503. The anterior half operation of extension buffer size information generation of the buffer size (1808 kB) for extension ID (0xFD) of 0x55 is done as follows.

stream_id=0xFD
P-STD_buffer_bound_scale=0
P-STD_buffer_size_bound=0
(stream_id==0xFD && P-STD_buffer_size_bound=0)

It is determined whether the record of the extension buffer size information is done in step S1504, and the record of the extension buffer size information does in step S1505 as follows.

'0xFD'=0xFD
'11'=0x3
Reserved=0x7F
stream_id_extension=0x55
'0xFD'=0xFD
'11'=0x3
P-STD_buffer_bound_scale_extension=1
P-STD_buffer_size_bound_extension=1808 (1808*1 kB=1808 kB)

It is determined in step S1506 whether the record of buffer size information is continued. In this case, because the record of buffer size information is continued, the process returns to step S1503, and generation of (0xC0) buffer size (8192B) for basic ID is done as follows.

stream_id=0xC0
P-STD_buffer_bound_scale=0
P-STD_buffer_size_bound=64(64*128B=8192 B)

Subsequently, it is determined in step S1506 whether the record of buffer size information is continued. As a result, because it is determined that the record of all buffer size information was finished, a PES header is generated in step S1507.

PES payload generation is done in step S1508 and generation of one pack is finished. The process returns to the beginning of the process.

(Data Demultiplexer)

Figure 15:
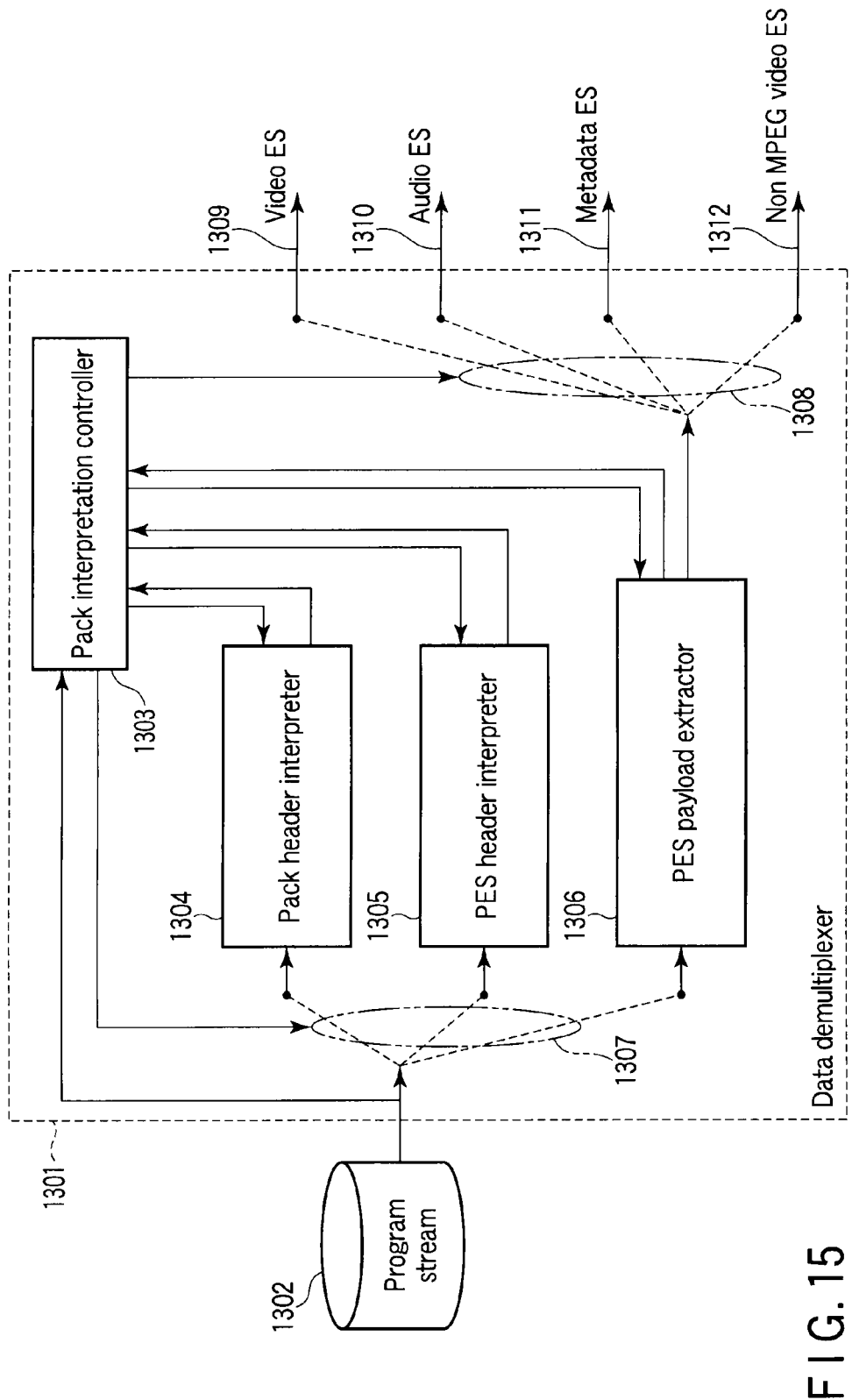
FIG. 15 is a block diagram of a data demultiplexer according to the first and second embodiments.

There will now be described a data demultiplexer to demultiplex each data from the program stream generated by the data multiplexing method described in the first or second embodiment referring to FIG. 15. The data demultiplexing operation corresponding to the program stream provided by the method shown in FIG. 3 is described here. However, the data demultiplexer of FIG. 15 can be applied to the program stream generated by the methods provided by FIGS. 7, 8, 9, 10 and 11.

The program stream 1302 is input to the data demultiplexer 1301, and video ES 1309 conformed to the MPEG standard, audio system ES 1310 conformed to the MPEG standard, metadata ES 1311 and non-MPEG video ES 1312 aside from MPEG, that are multiplexed in the program stream 1302, are demultiplexed and output. The pack interpretation controller 1303 controls the whole in the data demultiplexer 1301.

The pack interpretation controller 1303 confirms contents of the program stream 1302. When the pack interpretation controller 1303 determines that a pack header is input, it controls the switch 1307 to input the program stream 1302 to the pack header interpreter 1304 and starts the pack header interpreter 1304. The pack header interpreter 1304 interprets the program stream 1302 according to the structure of the pack header and sends a termination signal to the pack interpretation controller 1303 at the time of interpretation termination.

Successively, the pack interpretation controller 1303 confirms contents of program stream 1302. When the pack interpretation controller 1303 determines that a PES header is input, it controls the switch 1307 to input the program stream 1302 to the PES header interpreter 1305, and starts the PES header interpreter 1305. The PES header interpreter 1305 interprets the PES header according to the structure of the PES header, and sends a termination signal and stream ID information contained in the PES header and the number-ofbytes information of the following PES payload to the pack interpretation controller 1303 at the time of interpretation termination.

Subsequently, the pack interpretation controller 1303 controls the switch 1307 to input the program stream 1302 to the PES payload extractor 1306, controls an output selecting switch 1309 to select an appropriate output ahead according to the stream ID information, and starts the PES payload extractor 1306 to process a number of bytes of the PES payload. When processing a number of bytes of the PES payload, the PES payload extract unit 1306 sends a termination signal to the pack interpretation controller 1303.

(Pack Header Interpreter)

Figure 16:
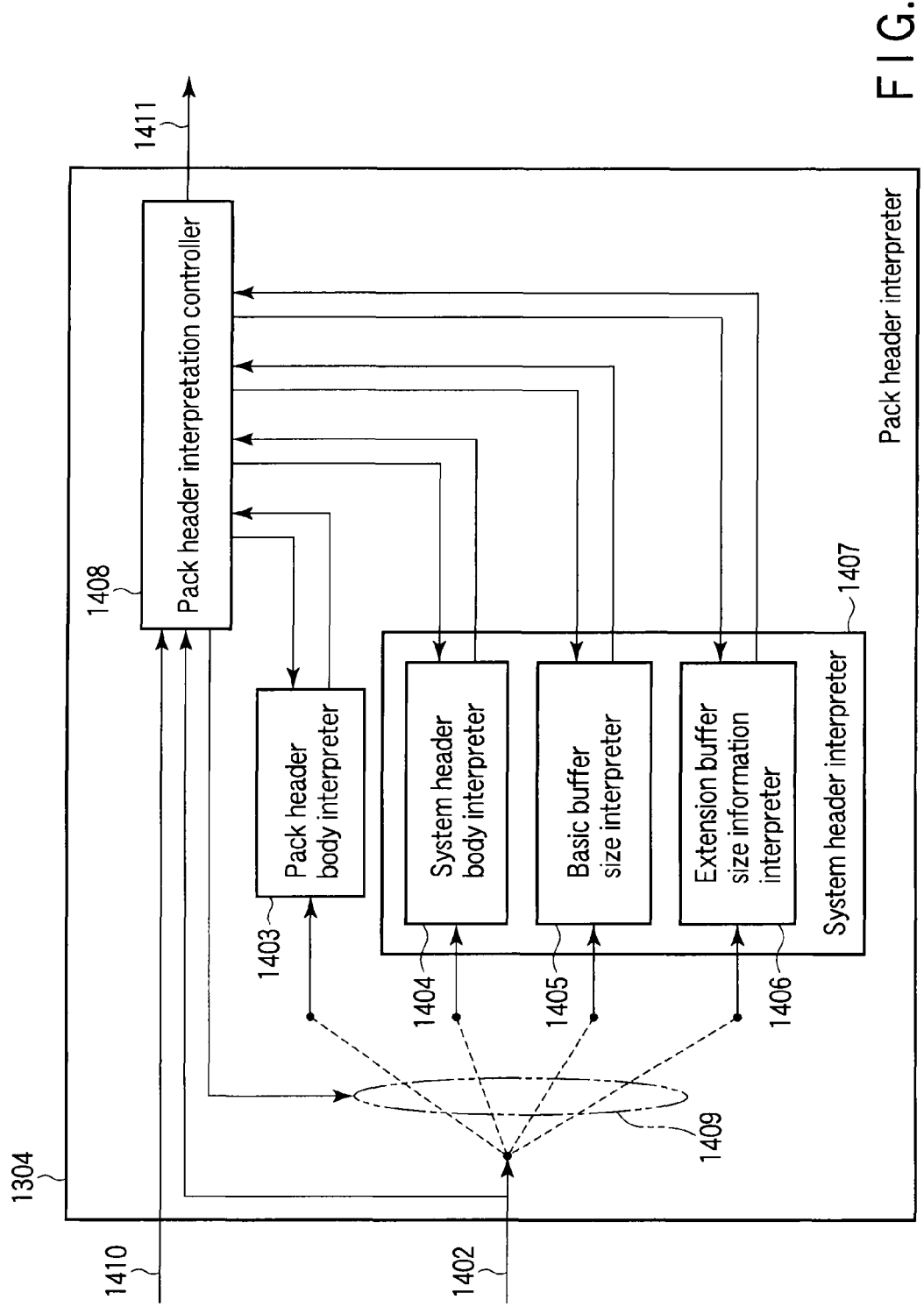
FIG. 16 is a block diagram of a pack header interpreter in FIG. 15.

As shown in FIG. 16, a program stream 1402 of an input and a start signal 1410 of the pack header interpreter 1304 are input to the pack header interpreter 1304, and after termination of pack header interpretation, a termination signal 1411 is output.

When the start signal 1410 is input to the pack header interpretation controller 1408, the pack header interpretation controller 1408 controls the switch 1409 to input the program stream 1402 to the pack header body interpreter 1403, and starts the pack header body interpreter 1403. The pack header body interpreter 1403 interprets the pack header according to the structure of the pack header body, and sends a termination signal to the pack header interpretation controller 1408 at the time of interpretation termination.

Subsequently, the pack header interpretation controller 1408 confirms contents of the program stream 1402. When determining that a system header is not input, the pack header interpretation controller 1408 outputs a termination signal 1411. When the pack header interpretation controller 1408 determines that the system header is input, it controls the switch 1409 to input the program stream 1402 to the system header body interpreter 1404 and starts the system header body interpreter 1404. The system header body interpreter 1404 interprets the system header according to the structure of the system header body and sends a termination signal to the pack header interpretation controller 1408 at the time of interpretation termination.

Subsequently, the pack header interpretation controller 1408 confirms contents of the program stream 1402. When determining that basic buffer size information is not input, the pack header interpretation controller 1408 outputs a termination signal 1411. When determining that the basic buffer size information is input, the pack header interpretation controller 1408 controls the switch 1409 to input the program stream 1402 to the basic buffer size information interpreter 1405, and starts the basic buffer size information interpreter 1405. The basic buffer size information interpreter 1405 interprets the basic buffer size information according to the structure of the basic buffer size information surrounded by a solid line frame of FIG. 3, and sends a termination signal and discrimination information indicating whether an extension ID follows to the pack header interpretation controller 1408 at the time of interpretation termination. In the example of FIG. 3, when stream_id is 0xFD and P-STD_buffer_size_bound is 0, the discrimination information indicating that the extension ID follows is sent.

When the extension ID does not follow, the pack header interpretation controller 1408 confirms contents of the program stream 1402. When determining that the basic buffer size information is not input, the pack header interpretation controller 1408 outputs a termination signal 1411. When determining that the basic buffer size information is input, the pack header interpretation controller 1408 controls the switch 1409 to input the program stream 1402 to the basic buffer size information interpreter 1405, and starts the basic buffer size information interpreter 1405. The above operation is repeated subsequently.

When the extension ID follows, the pack header interpretation controller 1408 controls the switch 1409 to input the program stream 1402 to the extension buffer size information interpreter 1406, and starts the extension buffer size information interpreter 1406. The extension buffer size information interpreter 1406 interprets the extension buffer size information according to the structure of the extension buffer size information surrounded by a dashed line frame of FIG. 3, and sends a termination signal to the pack header interpretation controller 1408 at the time of interpretation termination. The buffer size calculated by P-STD_buffer_bound_scale_extension and P-STD_buffer_size_bound_extension which were obtained here becomes a buffer size for the extension stream ID (stream_id_extension).

Subsequently, the pack header interpretation controller 1408 confirms contents of the program stream 1402, and determines whether the basic buffer size information is input. The following process is similar to the above.

(Data Demultiplexing Procedure)

Figure 17:
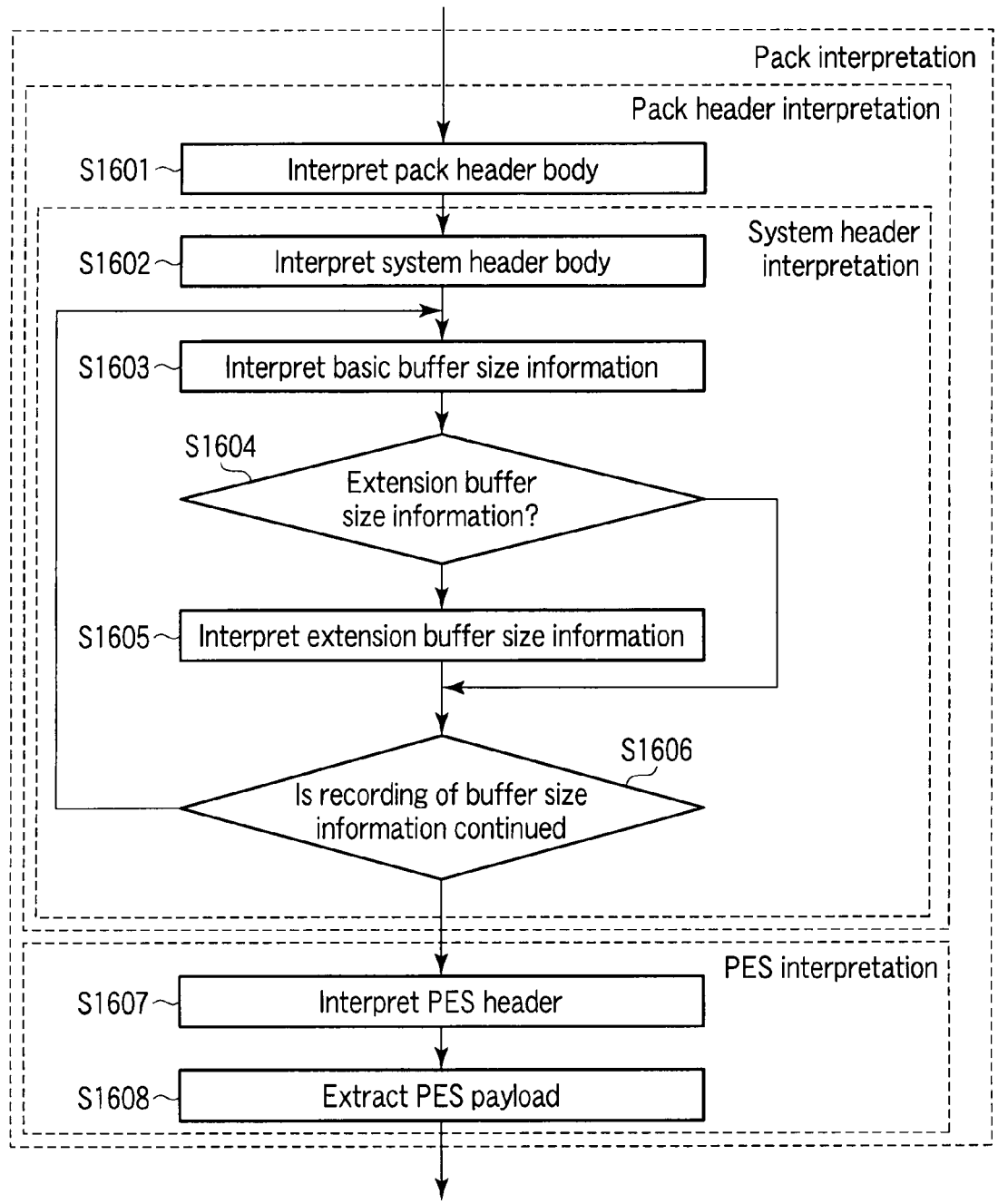
FIG. 17 is a flowchart for explaining a typical operation of the data demultiplexer.

An operation procedure of the data demultiplexer of FIG. 16 is described referring to FIG. 17. The data demultiplexing operation is explained according to a flowchart of FIG. 17 with an example where a data stream of a region recording buffer size information in a system header of a program stream of a data format shown in FIG. 3 is E0 E7 10 FD C0 00 FD FF D5 FD E7 10 C0 C0 40 in hexadecimal form.

When interpretation of a pack is started, at first the pack header body is interpreted in step S1601. When a system header is recorded in the pack, the system header body is interpreted in step S1602 as follows.

stream_id=0xE0
P-STD_buffer_bound_scale=1
P-STD_buffer_size_bound=1808(1808*1 kB=1808 kB)
Interpretation of E0 E7 10 is finished here.

In this way because stream_id is not 0xFD and P-STD_buffer_size_bound is not 0, "buffer size for stream_id of 0xE0 is interpreted as 1808 kB".

It is determined in step S1604 that extension buffer size information is not recorded. It is determined in step S1606 whether the buffer size information is ongoingly recorded. In step S1606, it is determined whether the top bit of the next data (0xFD) is 1. In this case, because the top bit of 0xFD is 1, the process returns to step S1603, and interpretation of the next buffer size information is done as follows.

stream_id=0xFD
P-STD_buffer_bound_scale=0
P-STD_buffer_size_bound=0
Interpretation of FD C0 00 is finished here.
In step S1604,
stream_id=0xFD && P-STD_buffer_size_bound=0

Therefore, it is determined that extension buffer size information is recorded, and step S1605 is executed.

In step S1605,
'0xFD'=0xFD
'11'=0x3
Reserved=0x7F
stream_id_extension=0x55
'0xFD'=0xFD
'11'=0x3
P-STD_buffer_bound_scale_extension=1
P-STD_buffer_size_bound_extension=1808 (1808*1 kB 1808 kB)

are interpreted. Interpretation of FD FF D5 FD E7 10 is finished here. As a result, it is interpreted that "the buffer size for the extension stream ID of 0x55 is 1808 kB".

In step S1606, it is determined whether the top bit of the next data (0xC0) is 1. In this case, because it is 1, the process returns to step S1603, and interpretation of the next buffer size information is done as follows.

stream_id=0xC0
P-STD_buffer_bound_scale=0
P-STD_buffer_size_bound=64 (64BX128=8192 B) are interpreted.

Interpretation of C0 C0 40 is finished here.

Because stream_id is not 0xFD and P-STD_buffer_size_bound is not 0, it is interpreted that "the buffer size for the extension stream ID of 0x55 is 8192B".

It is determined in step S1604 that the extension buffer size information is not recorded. It is determined in step S1606 whether the buffer size information is ongoingly recorded. Because the buffer size information is not recorded from then on, PES header interpretation of step S1607 and PES payload extraction of step S1608 are performed, and the process advances to a process for the next pack. The output at the time of PES payload extraction indicates a buffer size corresponding to the stream ID or extension stream ID which is provided in step S1607.

Third Embodiment

Yet another embodiment of the pack header generator of the data output multiplexer of the present invention will be described referring to FIG. 18. FIG. 18 shows a pseudo C code that shows the operations of the basic buffer size information generator 1204 and extension buffer size information generator 1205 in the system header generator 1202 of the pack header generator shown in FIG. 13.

In the case where extension buffer size information for an elementary stream expressed in a set of an extension ID and an extension stream ID is generated, in FIG. 18, 0xB7 (hexadecimal number) which is not a basic stream ID or an extension ID is selected as stream_id, and a data stream of 48 bits including 0xB7 is generated. The data stream of 48 bits is composed of two data streams of 24 bits, and as is shown in the true case of the if-statement of FIG. 18, the detail thereof is (A) a total of 24 bits including 0xB7 (8 bits, hexadecimal number) as the first field, 110000000b (9 bits, a binary number) as the second field, and stream_id_extension of 8 bits indicating the extension stream ID as the third field, and successively (B) a total of 24 bits including 0xB6 (8 bits, hexadecimal number) as the first field, 11b (2 bits, a binary number) as the second field, P-STD_buffer_bound_scale_extension of 1 bit as the third field indicating buffer bound scale information necessary for reproduction of an elementary stream having the extension stream ID of stream_id_extension, and P-STD_buffer_size_bound_extension of 13 bits as the fourth field indicating buffer size bound information necessary for reproduction of an elementary stream having the extension stream ID of stream_id_extension. The first 8 bits shown by (A) correspond to a stream_id on the if-statement of FIG. 18.

On one hand, when basic buffer size information for the elementary stream expressed in the basic stream ID is generated, a value of the basic stream ID is generated as stream_id. As is shown in the false (else) case of the if-statement of FIG. 18, basic buffer size information is generated by a 24 bits structure of stream_id (8 bit), 11b (2 bits, a binary number), P-STD_buffer_bound_scale (1 bit), and P-STD_buffer_size_bound (13 bits) similarly to the conventional method.

In the case that all extension buffer sizes are identical, in FIG. 18, stream_id=0xFD (hexadecimal number) is assumed, and basic buffer size information indicated by P-STD_buffer_bound_scale and P-STD_buffer_size_bound which are shown in false (else) case of the if-statement of FIG. 18 is generated. When the basic buffer size information expressed by stream_id=0xFD is acquired on the demultiplexing side, the information is regarded as size information of all extension buffers. As a result, when the sizes of all extension buffers are an identical value, the extension buffer size information can be represented by merely one set of 24-bit structures (i.e., 24 bits).

The extension buffer size information is calculated as

```
if (P-STD_buffer_bound_scale_extension == '0') {
    (P-STD buffer size for stream_id_extension)
        =128* P-STD_buffer_size_bound_extension
(byte)
}
else {
    (P-STD buffer size for stream_id_extension)
        =1024* P-STD_buffer_size_bound_extension
(byte)}
```

In other words, the extension buffer size information is calculated as (a) 128*P-STD_buffer_size_bound_extension bytes when a value of P-STD_buffer_bound_scale_extension is 0, (b) 1024*P-STD-buffer_size_bound_extension bytes when a value of P-STD_buffer_bound_scale_extension is not 0.

Further, the basic buffer size information is calculated as

```
if (P-STD_buffer_bound_scale == '0') {
    (P-STD buffer size for stream_id)
        =128*P-STD_buffer_size_bound (bytes)
}
else{
    (P-STD buffer size for stream_id)
        =1024*P-STD_buffer_size_bound (bytes)}
```

In other words, the basic buffer size information is calculated as (a) 128*P-STD_buffer_size_bound bytes when a value of P-STD_buffer_bound_scale is 0, (b) 1024*P-STD_buffer_size_bound bytes when a value of P-STD_buffer_bound_scale is not 0.

(Data Demultiplexer)

A data demultiplexer of demultiplexing each data from the program stream generated by the data multiplexing method described in the third embodiment will be described referring to FIG. 15. The data demultiplexing operation corresponding to the program stream provided by the method shown in FIG. 18 is described.

A program stream 1302 is input to a data demultiplexer 1301. A video ES 1309 conformed to the MPEG standard, an audio ES 1310 conformed to the MPEG standard, metadata ES 1311 and a non-MPEG video ES 1312 aside from MPEG, which are multiplexed in the program stream 1302 are demultiplexed and output. In the data demultiplexer 1301, a pack interpretation controller 1303 controls the whole of the data demultiplexer.

The pack interpretation controller 1303 confirms contents of the program stream 1302. When determining that a pack header is input, the pack interpretation controller 1303 controls a switch 1307 to input the program stream 1302 to a pack header interpreter 1304 and starts the pack header interpreter 1304. The pack header interpreter 1304 interprets the program stream 1302 according to the structure of the pack header and sends a termination signal to the pack interpretation controller 1303 at the time of interpretation termination.

Successively, the pack interpretation controller 1303 confirms the contents of the program stream 1302. When determining that a PES header is input, the pack interpretation controller 1303 controls the switch 1307 to input the program stream 1302 to the PES header interpreter 1305 and starts the PES header interpreter 1305. The PES header interpreter 1305 interprets the PES header according to the structure of the PES header, and sends a termination signal, stream ID information contained in the PES header and the number-of-bytes information of the following PES payload to the pack interpretation controller 1303 at the time of interpretation termination.

Successively, the pack interpretation controller 1303 controls the switch 1307 so that the program stream 1302 is input to a PES payload extractor 1306, controls an output selecting switch 1309 so as to be an appropriate output destination according to the stream ID information, and starts the PES payload extractor 1306 so as to process a number of bytes of a PES payload. When the PES payload extractor 1306 processes a number of bytes of the PES payload, it sends a termination signal to the pack interpretation controller 1303.

(Pack Header Interpreter)

As shown in FIG. 16, the pack header interpreter 1304 receives the input program stream 1402 and the start signal 1410 for the pack header interpreter 1304, and outputs a termination signal 1411 after termination of pack header interpretation.

When the start signal 1410 is input to the pack header interpretation controller 1408, the pack header interpretation controller 1408 controls the switch 1409 so that the program stream 1402 is input to the pack header body interpreter 1403 and starts the pack header body interpreter 1403. The pack header body interpreter 1403 interprets the pack header according to the structure of the pack header body and sends a termination signal to the pack header interpretation controller 1408 at the time of interpretation termination.

Successively, the pack header interpretation controller 1408 confirms the contents of the program stream 1402. When determining that the system header is not input, the pack header interpretation controller 1408 outputs a termination signal 1411. When determining that a system header is input, the pack header interpretation controller 1408 controls the switch 1409 so that the program stream 1402 is input to the system header body interpreter 1404, and starts the system header body interpreter 1404. The system header body interpreter 1404 interprets the system header according to the structure of the system header body, and sends a termination signal to the pack header interpretation controller 1408 at the time of interpretation termination.

Successively, the pack header interpretation controller 1408 confirms the contents of the program stream 1402. When determining that basic buffer size information or extension buffer size information is not input, the pack header interpretation controller 1408 outputs the termination signal 1411. The pack header interpretation controller 1408 confirms the contents of the program stream 1402. When determining that the basic buffer size information or the extension buffer size information is input, the pack header interpretation controller 1408 determines whether the basic buffer size information is input or the extension buffer size information is input.

When the basic buffer size information is input, the pack header interpretation controller 1408 controls the switch 1409 so that the program stream 1402 is input to the basic buffer size information interpreter 1405 and starts the basic buffer size information interpreter. The basic buffer size information interpreter 1405 interprets the basic buffer size information according to stream_id (8 bits) of FIG. 18 and the structure of the contents (16 bits in total) of the else-statement, and sends a termination signal to the pack header interpretation controller 1408 at the time of interpretation termination.

When the extension buffer size information is input, the pack header interpretation controller 1408 controls the switch 1409 so that the program stream 1402 is input to the extension buffer size information interpreter 1406 and starts the extension buffer size information interpreter 1406. The extension buffer size information interpreter 1406 interprets the extension buffer size information according to stream_id (8 bits) of FIG. 18 and the structure of the contents (40 bits in total) of the if-statement and sends a termination signal to the pack header interpretation controller 1408 at the time of interpretation termination. In an example of the structure shown in FIG. 18, the buffer size for the extension stream ID indicated by stream_id_extension becomes a size calculated by P-STD_buffer_bound_scale_extension and P-STD_buffer_size_bound_extension.

Subsequently, the pack header interpretation controller 1408 determines whether another basic buffer size information or extension buffer size information is input. When the basic buffer size information or the extension buffer size information is continuously input, interpretation of the basic buffer size information or extension buffer size information is continued. When another basic buffer size information or extension buffer size information is not input, the termination signal 1411 is output, and the back header interpreter 1304 stops its operation.

Figure 19:
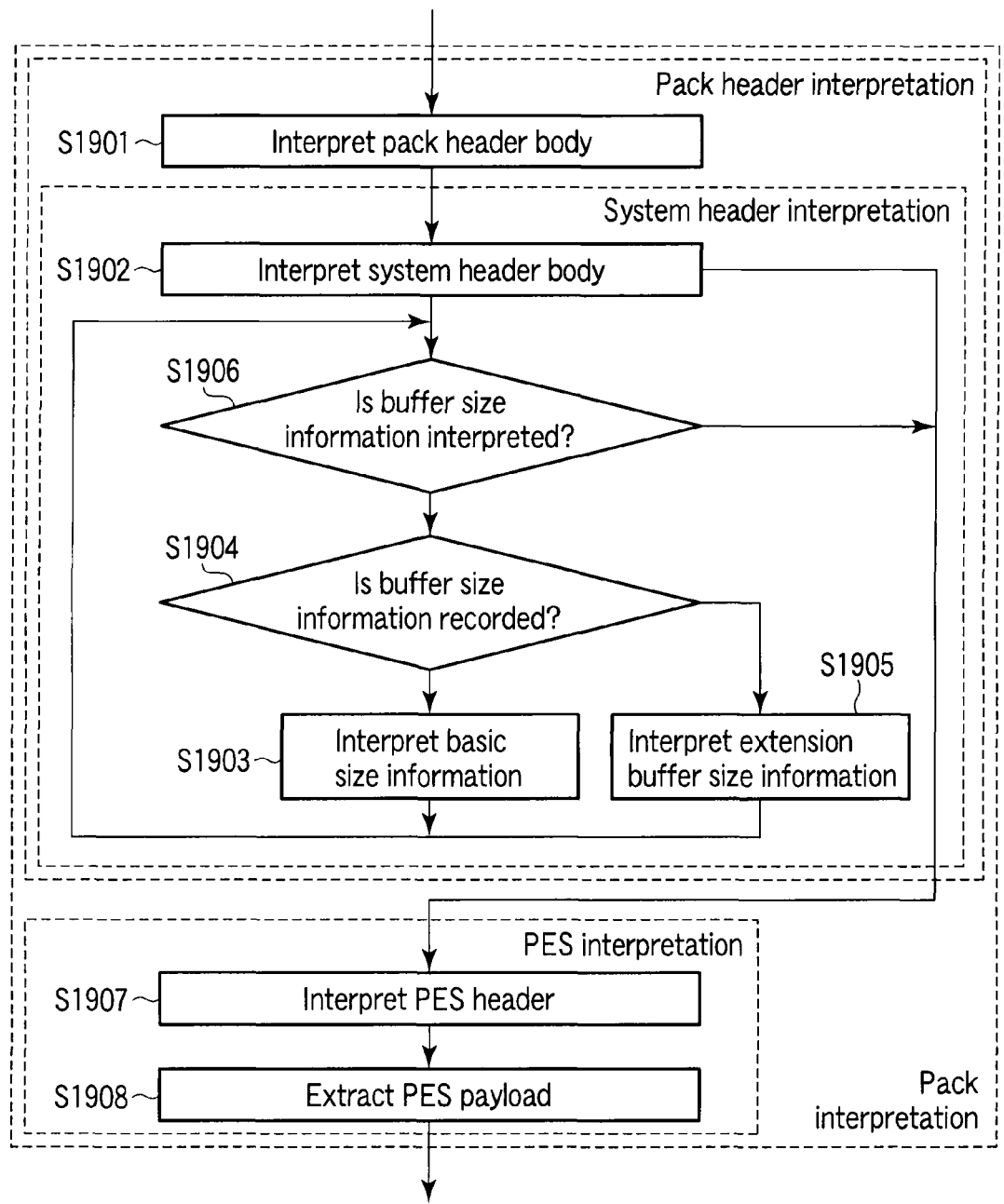
FIG. 19 is a flowchart for explaining a demultiplexing method of the demultiplexer.

A method for multiplexing the data generated according to FIG. 18 with the data demultiplexer of FIG. 15 will be described referring to a flowchart of FIG. 19 hereinafter. The data demultiplexing operation is explained with an example where a data stream of a region recording buffer size information of a system header of a program stream of a data format shown in FIG. 18 is E0 E7 10 B7 C0 55 B6 CB A5 00 in hexadecimal form.

When interpretation of a pack is started, at first the pack header body is interpreted in step S1901. When the system header is not recorded in the pack, step S1902 is finished instantly, and PES header interpretation step S1907 is executed to perform PES interpretation. When the system header is recorded in the pack, the system header body is interpreted in step S1902, and then the process advances to step S1906 to interpret and confirm the buffer size information.

As described above, in this example, since a data stream concerning the buffer size information is E0 E7 B7 C0 55 B6 CB A5 00, and the first one bit is "1", existence of the buffer size information is determined in step S1906, and the process advances to step S1904 to confirm which buffer the buffer size information refers to. It is determined in step S1904 that the basic buffer size information is recorded since the first 8 bits are E0, and interpretation of the basic buffer size information of step S1903 is carried out. In step S1903, the basic buffer size information for the basic stream ID of E0 is interpreted.

Because the following data stream of 16 bits is E7 10, it is interpreted by FIG. 18 as follows.

stream_id=0xE0
    P-STD_buffer_bount_scale=1
    P-STD_buffer_size_bound=1808 (a decimal number)

In other words, the interpretation that the basic buffer size for stream id=0xE0 is 1808 kB is done. Next, the process returns to step S1906. At this time, because a data stream concerning the buffer size information in the system header is B7 C0 55 B6 CB A5 00, and the first 1 bit is "1", it is determined in step S1906 that the buffer size information exists. The process advances to step S1904 to confirm the kind of buffer size. It is determined in step S1904 that the extension buffer size information is recorded since the first 8 bits are B7. Thus, interpretation of extension buffer size information of step S1905 is carried out. In step S1905, 16 bits (C055) following B7 are read out, and interpretation that the extension stream ID (stream_id_extension) is 0x55 is done. Next, 0xB6 of 8 bits is read, and because the following 16 bits are CBA5, it is interpreted by FIG. 18 as follows.

stream_id_extension=0x55
    P-STD_buffer_bount_scale_extension=0
    P-STD_buffer_size_bound_extension=2981 (a decimal number).

In other words, interpretation that the extension buffer size for stream_id_extension=0x55 is 381,568 Bytes (=2981*128) is done. Next, the process returns to step S1906. At this time, a data stream concerning the buffer size information in the system header is 00, and the first 1 bit is '0', and therefore, it is determined in step S1906 that there is no buffer size information, and PES header interpretation of step S1907 and PES payload extraction of step S1908 are executed.

The data demultiplexing operation relating to another embodiment is explained with an example where a data stream of a region recording buffer size information of a system header of a program stream of a data format shown in FIG. 18 is E0 E7 10 FD C0 55 B6 CB A5 00 in hexadecimal form.

Because the first 3 bytes are E0 E7 10, as described in the above embodiment, they are interpreted as stream_id=0xE0
    P-STD_buffer_bount_scale=1
    P-STD_buffer_size_bound=1808 (decimal number)

The following FD C0 55 B6 CB A5 is interpreted as stream_id=0xFD
    P-STD_buffer_bount_scale=0
    P-STD_buffer_size_bound=2981 (a decimal number)

Because stream_id is 0xFD, the basic buffer size information expressed by a set of P-STD_buffer_bount_scale and P-STD_buffer_size_bound is interpreted as extension buffer size of all elementary streams converted to PES by use of the extension stream ID, and its size is interpreted as 381,568 Bytes (=2981*128).

In addition, the specific stream_id (0xB7) and specific value (0xB6) are used in the present embodiment. However, if these values are values other than 0xB8 to 0xFF prescribed as a value which is used for MPEG-2 systems standard, there is no problem even if which value is used in principle. The value '00 0000 0' (in binary form) of if-statement is also desirable. However, it is not necessary to be always this value for a purpose of the present invention.

According to the present invention, when the basic buffer size information paired with the extension ID takes 0 byte, a pair of extension stream ID and extension buffer size information are recorded while keeping the same structure as the present standard. Further, flag information indicating whether the extension buffer size information for the extension stream ID is recorded in a region reserved for future extension is provided, and a pair of extension stream ID and extension buffer size information are recorded while keeping the same structure as the present standard.

According to the present invention, the pair of extension stream ID and extension buffer size information are interpreted with existing equipment according to the existing MPEG-2 Systems standard without occurring a reproduction error, a program stream is properly reproduced, and backward compatibility is assured. On one hand, even when the program stream generated according to the existing MPEG-2 Systems standard is input, it is interpreted without causing a reproduction error and properly reproduced, and forward compatibility is assured.

The data multiplexing and data demultiplexing based on each embodiment mentioned above can be realized even by hardware, and can be executed by software using a computer such as a personal computer. Accordingly, the present invention can provide a program for executing data multiplexing, a program for executing data demultiplexing or a computer-readable storage medium which stored the program.

The present invention is not limited to the above-described embodiments as it is, but may be realized by modifying components without departing from the scope implementation phase. Various inventions can be realized by appropriately combining the structural elements disclosed in the embodiments. For instance, some of the disclosed structural elements may be deleted. Some structural elements of different embodiments may be combined appropriately.

Data multiplexing/demultiplexing method and apparatus are used for multiplexing and demultiplexing encoded data of video data, audio data and meta data in communication media, accumulation media and broadcast media.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data multiplexing apparatus comprising:
   an input unit to input an elementary stream representing at least one data of video data, audio data and metadata,
   a packetized elementary stream (PES) payload generator to generate a plurality of PES payloads by dividing the elementary stream;
   a PES packet generator to generate a plurality of PES packets corresponding to the plurality of PES payloads, respectively, by adding, to each of the plurality of PES payloads, a PES header including either (A) a basic stream ID that is a value of a given range which is expressible in 8 bits or (B) a set of an extension ID that is a value that is expressible in 8 bits outside the given range and an extension stream ID that is a value that is expressible in 7 bits, to identify data contained in the PES payload;
   a basic buffer size information generator to generate buffer size information for a basic stream ID of 24 bits comprising a first field of 8 bits indicating the basic stream ID, a second field of 2 bits following the first field, a third field of 1 bit following the second field and indicating buffer bound scale information necessary for reproduction of the elementary stream identified by the basic stream ID, and a field of 13 bits following the third field and indicating buffer size bound information necessary for reproduction of the elementary stream;
an extension buffer size information generator to generate buffer size information for an extension stream ID of 48 bits including (C) information of 24 bits comprising a first field of 8 bits indicating a first identification ID that is a value expressible in 8 bits outside the given range and different from the extension ID, a second field of 9 bits following the first field and a third field of 7 bits following the second field and indicating the extension stream ID and (D) information of 24 bits comprising a first field of 8 bits indicating a second identification ID that is a value different from the first identification ID and the extension ID and is expressible in 8 bits outside the given range, a second field of 2 bits following the first field, a third field of 1 bit following the second field and indicating buffer bound scale information necessary for reproduction of the elementary stream identified by a set of the extension ID and the extension stream ID, and a fourth field of 13 bits following the third field and indicating buffer size bound information necessary for reproduction of the elementary stream;
a pack generator to generate a pack by adding a pack header including a system header including the basic buffer size information for reproducing an elementary stream corresponding to each of the PES packets and the extension buffer size information to a PES packet sequence of the plurality of PES packets; and
an output unit to output a program stream containing the pack.

2. A data demultiplexer which demultiplexes the elementary stream from the program stream generated with the data multiplexer according to claim 1, which comprises:
an input to input the program stream;
a pack header interpreter to interpret the pack header;
a PES header interpreter to interpret the PES header;
a PES payload extractor to extract the PES payload to obtain the elementary stream;
an input selector to select a destination in which the program stream is processed;
an output selector to select a destination to which the elementary stream is output; and
a pack interpretation controller to control operations of the pack header interpreter, the PES header interpreter, the PES payload extractor, the input selector and the output selector,
wherein the pack header interpreter comprises a pack header input selector to select a destination in which the pack header is processed, a pack header body interpreter to interpret the pack header body, a system header body interpreter to interpret the system header body, a basic buffer size information interpreter to interpret the basic buffer size information, an extension buffer size information interpreter to interpret the extension buffer size information, and a pack header interpretation controller to control operations of the pack header input selector, the pack header body interpreter, the system header body interpreter, the basic buffer size information interpreter and extension buffer size information interpreter, and
when receiving an instruction of operation start from the pack generation controller, the pack header interpretation controller starts the pack header body interpreter, and when interpreting the system header, it starts any one of the system header body interpreter, the basic buffer size information interpreter and the extension buffer size information interpreter or both of them.

3. The data demultiplexer according to claim 2, wherein when the first field of 8 bits indicating the basic stream ID is 0xFD, the basic buffer size information interpreter interprets the following basic buffer size information indicated by 16 bits as extension buffer size information for one or more elementary streams converted in PES by a set of all extension IDs and extension stream ID.

4. The data multiplexer according to claim 1, wherein when a plurality of elementary streams which is identified by the set of extension ID and extension stream ID and whose extension buffer size information has an identical value are multiplexed, or when one elementary stream identified by the set of extension ID and extension stream ID is multiplexed, the basic buffer size information generator sets a value of the first field of 8 bits indicating the basic stream ID to 0xFD and generates the extension buffer size information of 24 bits comprising a first field, a second field of 2 bits following the first field, a third field of 1 bit following the second field and a fourth field of 13 bits following the third field.

5. A data demultiplexer which demultiplexes the elementary stream from the program stream generated with the data multiplexer according to claim 4, which comprises:
an input to input the program stream;
a pack header interpreter to interpret the pack header;
a PES header interpreter to interpret the PES header;
a PES payload extractor to extract the PES payload to obtain the elementary stream;
an input selector to select a destination in which the program stream is processed;
an output selector to select a destination to which the elementary stream is output; and
a pack interpretation controller to control operations of the pack header interpreter, the PES header interpreter, the PES payload extractor, the input selector and the output selector,
wherein the pack header interpreter comprises a pack header input selector to select a destination in which the pack header is processed, a pack header body interpreter to interpret the pack header body, a system header body interpreter to interpret the system header body, a basic buffer size information interpreter to interpret the basic buffer size information, an extension buffer size information interpreter to interpret the extension buffer size information, and a pack header interpretation controller to control operations of the pack header input selector, the pack header body interpreter, the system header body interpreter, the basic buffer size information interpreter and extension buffer size information interpreter, and
when receiving an instruction of operation start from the pack generation controller, the pack header interpretation controller starts the pack header body interpreter, and when interpreting the system header, it starts any one of the system header body interpreter, the basic buffer size information interpreter and the extension buffer size information interpreter or both of them.

6. The data demultiplexer according to claim 5, wherein when the first field of 8 bits indicating the basic stream ID is 0xFD, the basic buffer size information interpreter interprets the following basic buffer size information indicated by 16 bits as extension buffer size information for one or more elementary streams converted in PES by a set of all extension IDs and extension stream ID.

* * * * *